United States Patent
Kaneko et al.

(10) Patent No.: US 6,591,619 B2
(45) Date of Patent: Jul. 15, 2003

(54) MOTOR-OPERATED SELECTOR VALVE AND REFRIGERATING CYCLE DEVICE FOR REFRIGERATOR-FREEZER

(75) Inventors: Morio Kaneko, Saitama (JP); Akira Kasai, Saitama (JP)

(73) Assignee: Kabushiki Kaisha Saginomiya Seisakusho, Tokyo (JP)

( * ) Notice: Subject to any disclaimer, the term of this patent is extended or adjusted under 35 U.S.C. 154(b) by 0 days.

(21) Appl. No.: 10/110,583

(22) PCT Filed: Jul. 31, 2001

(86) PCT No.: PCT/JP01/06586

§ 371 (c)(1),
(2), (4) Date: Apr. 11, 2002

(87) PCT Pub. No.: WO02/14724

PCT Pub. Date: Feb. 21, 2002

(65) Prior Publication Data

US 2002/0148241 A1 Oct. 17, 2002

(30) Foreign Application Priority Data

Aug. 11, 2000 (JP) ......................................... 2000-244267
Dec. 27, 2000 (JP) ......................................... 2000-398460

(51) Int. Cl.⁷ .............................. F25B 5/00; F16K 11/00
(52) U.S. Cl. ................ 62/117; 137/625.31; 137/625.42
(58) Field of Search ....................... 137/625.31, 625.17, 137/625.42, 625.46, 625.43; 62/117, 199; 165/296; 251/287

(56) References Cited

U.S. PATENT DOCUMENTS

| | | |
|---|---|---|
| 5,690,144 A | 11/1997 | Takahashi |
| 5,957,377 A | 9/1999 | Inoue et al. |
| 6,491,063 B1 * | 12/2002 | Benatav ................. 137/625.43 |

FOREIGN PATENT DOCUMENTS

| | | |
|---|---|---|
| JP | 58-13281 | 1/1983 |
| JP | 2-95150 | 4/1990 |
| JP | 3-553 | 1/1991 |
| JP | 6-174118 | 6/1994 |
| JP | 8-135812 | 5/1996 |
| JP | 8-178093 | 7/1996 |
| JP | 11-132577 | 5/1999 |

* cited by examiner

Primary Examiner—Chen Wen Jiang
(74) Attorney, Agent, or Firm—Butzel Long

(57) ABSTRACT

In order to realize higher compatibility of high-performability and energy saving of a refrigerator-freezer, a valve housing having one inlet port normally communicating with a valve chamber and first and second outlet ports B, C opening on a bottom face of the valve chamber, a valve body 17 rotatably provided in the valve chamber and having a partition wall portion 20, on its end face facing a bottom face of the valve chamber, to partition the end face into an opening area 18 communicated with the valve chamber and a non-opening area 19 not communicating with the valve chamber, and an electric actuator to steppingly turn the valve body 17 are provided for an electrically operated selector valve used in a refrigerating cycle unit for the refrigerator-freezer, and the position of the valve body 17 is changed by four positions A–D.

19 Claims, 7 Drawing Sheets

FIG. 6A [0 PULSE]
- A→B: OPEN
- A→C: OPEN

FIG. 6B [18 PULSE]
- A→B: OPEN
- A→C: CLOSE

FIG. 6C [36 PULSE]
- A→B: CLOSE
- A→C: CLOSE

FIG. 6D [54 PULSE]
- A→B: CLOSE
- A→C: OPEN

· CHANNEL A→B
FULL OPEN
FULL CLOSE
0  10  18 20  30  36 40  50 54  (PULSE)

· CHANNEL A→C
FULL OPEN
FULL CLOSE
0  10  18 20  30  36 40  50 54  (PULSE)

MOTOR-OPERATED SELECTOR VALVE AND REFRIGERATING CYCLE DEVICE FOR REFRIGERATOR-FREEZER

TECHNICAL FIELD

The present invention relates to an electrically operated selector valve and a refrigerating cycle unit for a refrigerator-freezer.

BACKGROUND ART

A need that a domestic refrigerator-freezer used through the year shall be operated and controlled diversely accurately and simultaneously high-performability and energy saving of the domestic refrigerator-freezer shall be compatible is increasing recently.

As a refrigerating cycle unit for such a refrigerator-freezer is disclosed in Japanese Patent Application Laid-open No. 11-132577, wherein a condenser is connected to a discharge side of a compressor, an inlet port of a three-way valve is connected to the down stream of the condenser, a freezer-applied capillary tube is connected to one outlet port of the three-way valve, a refrigerator-applied capillary tube is connected to the other outlet port of the three-way valve, and a freezer-applied evaporator, a refrigerator-applied evaporator, and the suction side of the compressor are connected to the down stream of the freezer-applied capillary tube and the refrigerator-applied capillary tube.

In the above refrigerating cycle unit, the downstream of the condenser is selectively connected to either one of the freezer-applied capillary tube and the refrigerator-applied capillary tube with a changeover operation of the three-way valve, so that a freezer preferential operating mode and a refrigerator preferential operating mode can be are selected and the cycle efficiency can be enhanced.

However, in the above refrigerating cycle unit, the three-way valve has only two changeover positions; that is, a changeover position of connecting the inlet port to only the one outlet port and another changeover position of connecting the inlet port to only the other outlet port. Therefore, only the two operating modes, i.e. the freezer preferential operating mode wherein the downstream of the condenser is connected to the freezer-applied capillary tube and the refrigerator preferential operating mode wherein the downstream of the condenser is connected to the refrigerator-applied capillary tube of the condenser, can be set. That is, high-performability and energy saving of the refrigerator-freezer are not sufficiently highly compatible.

DISCLOSURE OF THE INVENTION

In view of the foregoing, an object of the present invention is to provide an electrically operated selector valve establishing various changeover for use in a refrigerating cycle unit for a refrigerator-freezer and a refrigerating cycle unit, for the refrigerator-freezer, to make high-performability and energy saving of the refrigerator-freezer highly compatible.

In order to achieve the above object, the inventive electrically operated selector valve set forth in claim 1 comprises a valve housing having a valve chamber, a single inlet port normally communicating with the valve chamber, and outlet ports opening on a flat bottom face of the valve chamber while being apart from each other, a valve body rotatably provided in the valve chamber, having a port open-close shaped portion, on an end face facing the bottom face of the valve chamber, to connect, or cut off, the valve chamber from the outlet port, and changing the connection, or the cutoff, between the valve chamber and the outlet port by a turning movement of the port open-close shaped portion with respect to the outlet port, and an electric actuator to steppingly turn the valve body.

And, the inventive electrically operated selector valve set forth in claim 12 comprises a base plate having an inlet port and outlet ports bored therethrough and acting as a valve seat plate, a cap-like rotor casing connected airtight to one side of the base plate and making an airtight rotor/valve chamber along with the base plate, a valve body rotatably provided in the rotor/valve chamber, having a port open-close shaped portion, on an end face facing the base plate, to connect, or cut off, the inlet port from the outlet port, and changing the connection, or the cutoff, between the inlet port and the outlet port by a turning movement of the port open-close shaped portion with respect to the outlet port, a rotor rotatably provided in the rotor/valve chamber and having a multipole magnet of a stepping motor attached to the valve body, and a cylindrical stator coil assembly member, of the stepping motor, fixed to an outside of the rotor casing.

And, in order to achieve the above object, the inventive refrigerating cycle unit for a refrigerator-freezer set forth in claim 19, wherein a refrigerant, through a condenser, from a discharge of a compressor is supplied selectively to a freezer-applied capillary tube and a freezer-applied evaporator or to a refrigerator-applied capillary tube and a refrigerator-applied evaporator and flows to a suction of the compressor, is characterized in that the electrically operated selector valve set forth in claim 18 is provided between downstream of the condenser and upstream of either the freezer-applied capillary tube or the refrigerator-applied capillary tube, the inlet port is connected with the downstream of the condenser, the first outlet port is connected with the upstream of the freezer-applied capillary tube, and the second outlet port is connected with the upstream of the refrigerator-applied capillary tube.

BRIEF DESCRIPTION OF THE DRAWINGS

FIGS. 6A–6D are schematic illustrations showing changeover positions and respective changeover characteristics of the electrically operated selector valve of FIG. 2.

BEST MODE OF THE INVENTION

Figure 1:
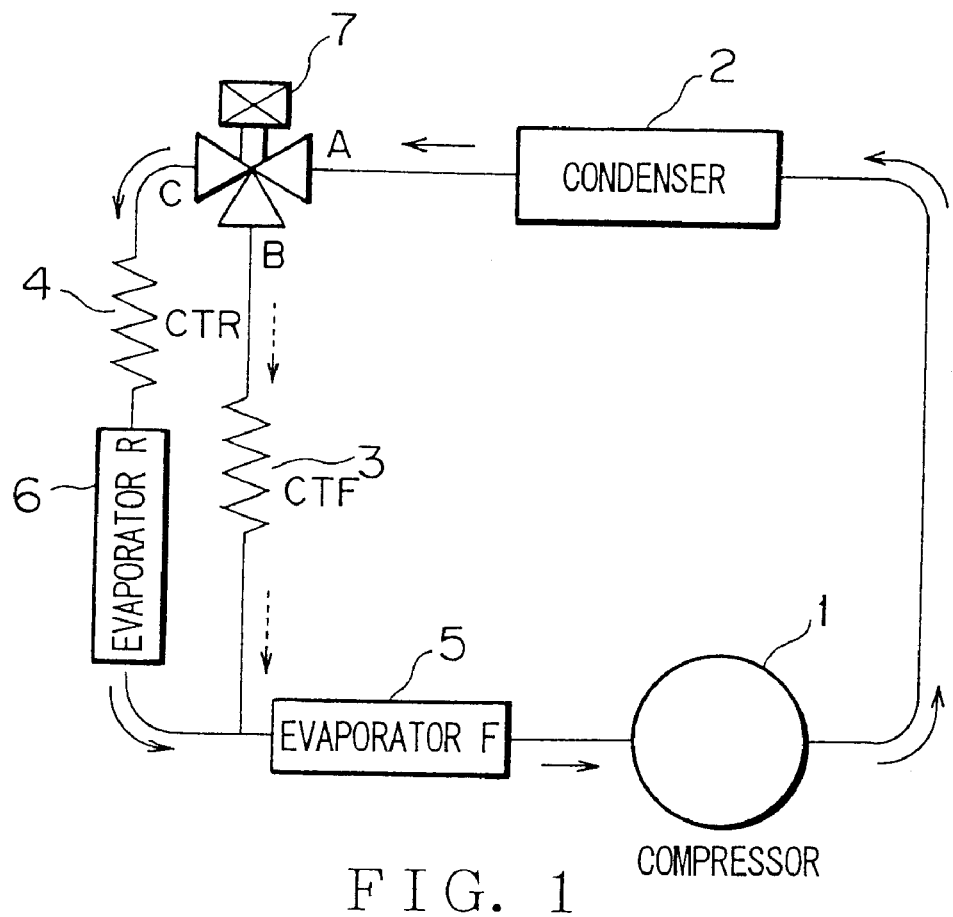
FIG. 1 is a diagram showing an embodiment of the inventive refrigerating cycle unit for a refrigerator-freezer.
Figure 4:
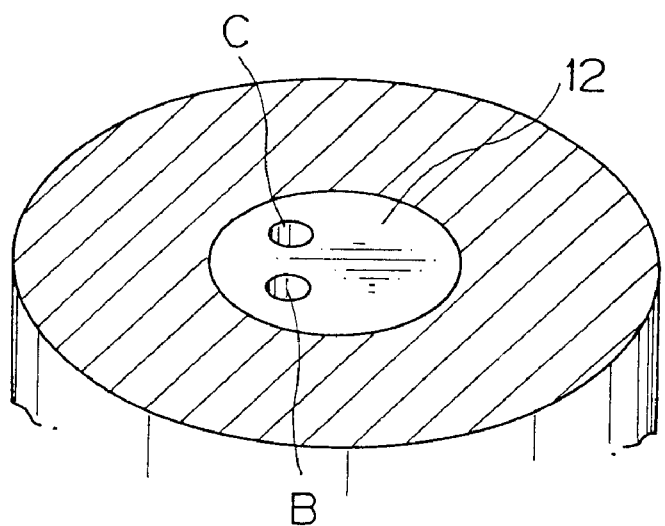
FIG. 4 is a perspective view of a valve seat face portion of the electrically operated selector valve of FIG. 2.
Figure 2:
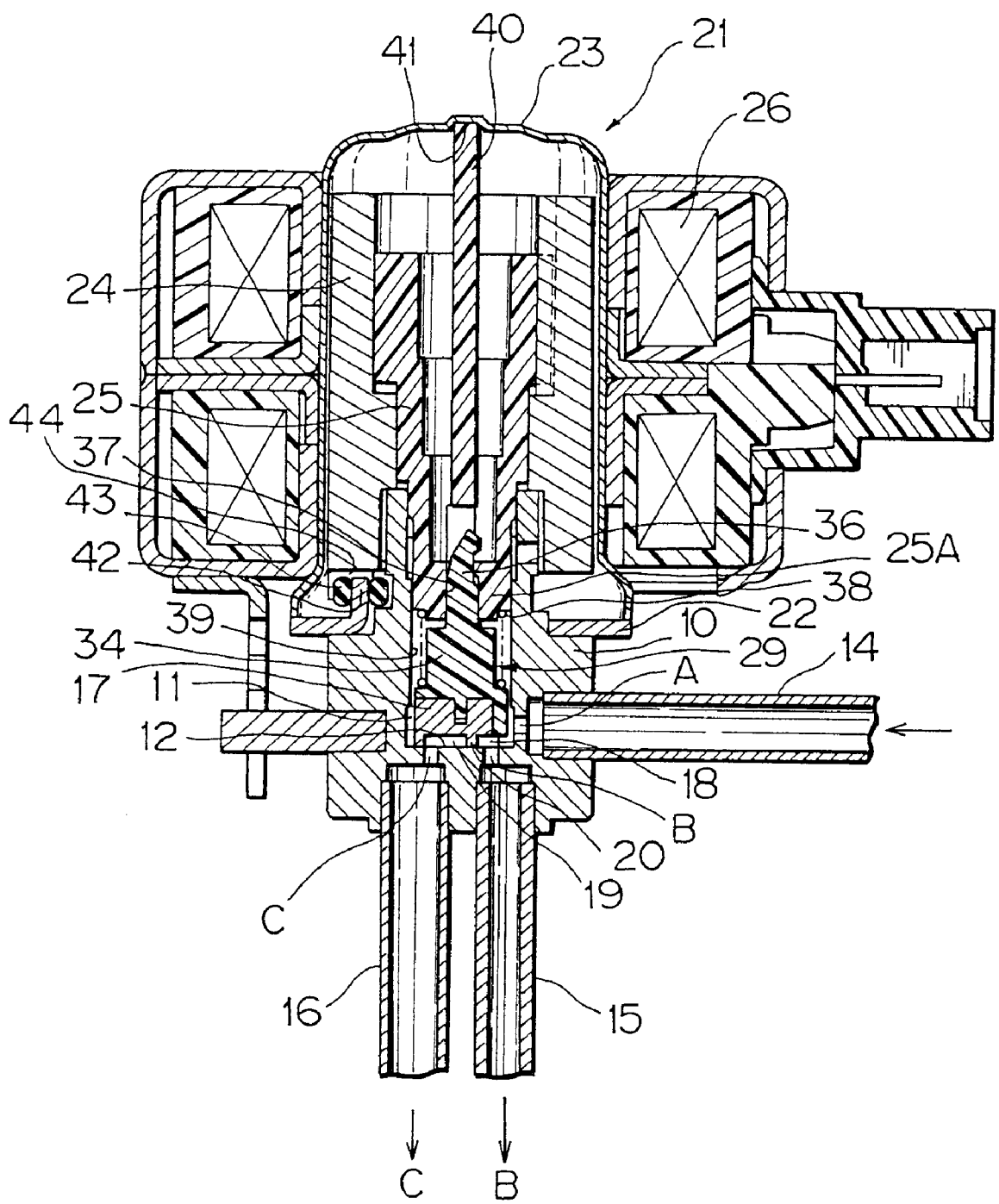
FIG. 2 is a sectional view showing a first embodiment of the inventive electrically operated selector valve.
Figure 3:
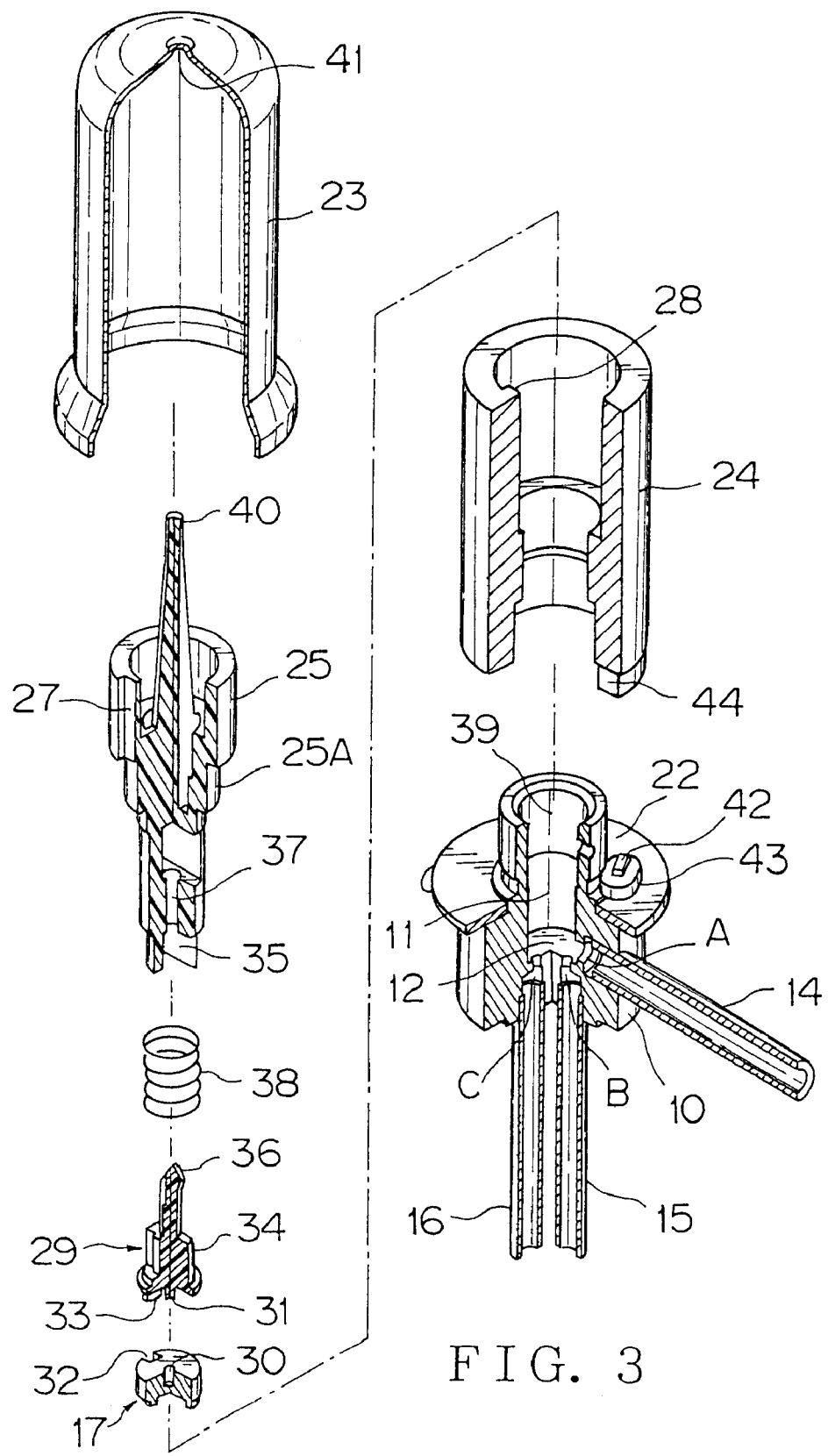
FIG. 3 is an exploded perspective view of the electrically operated selector valve of FIG. 2.
Figure 5:
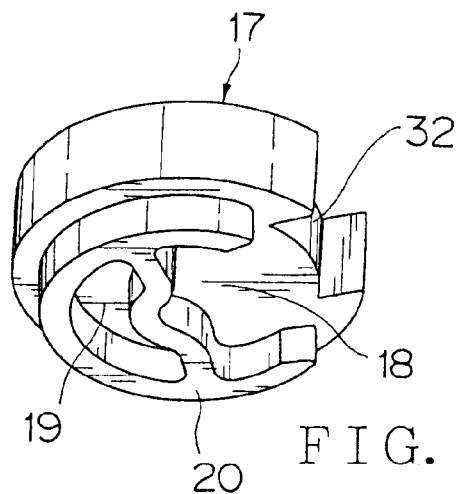
FIG. 5 is a perspective view of a valve body of the electrically operated selector valve of FIG. 2.
Figure 7:
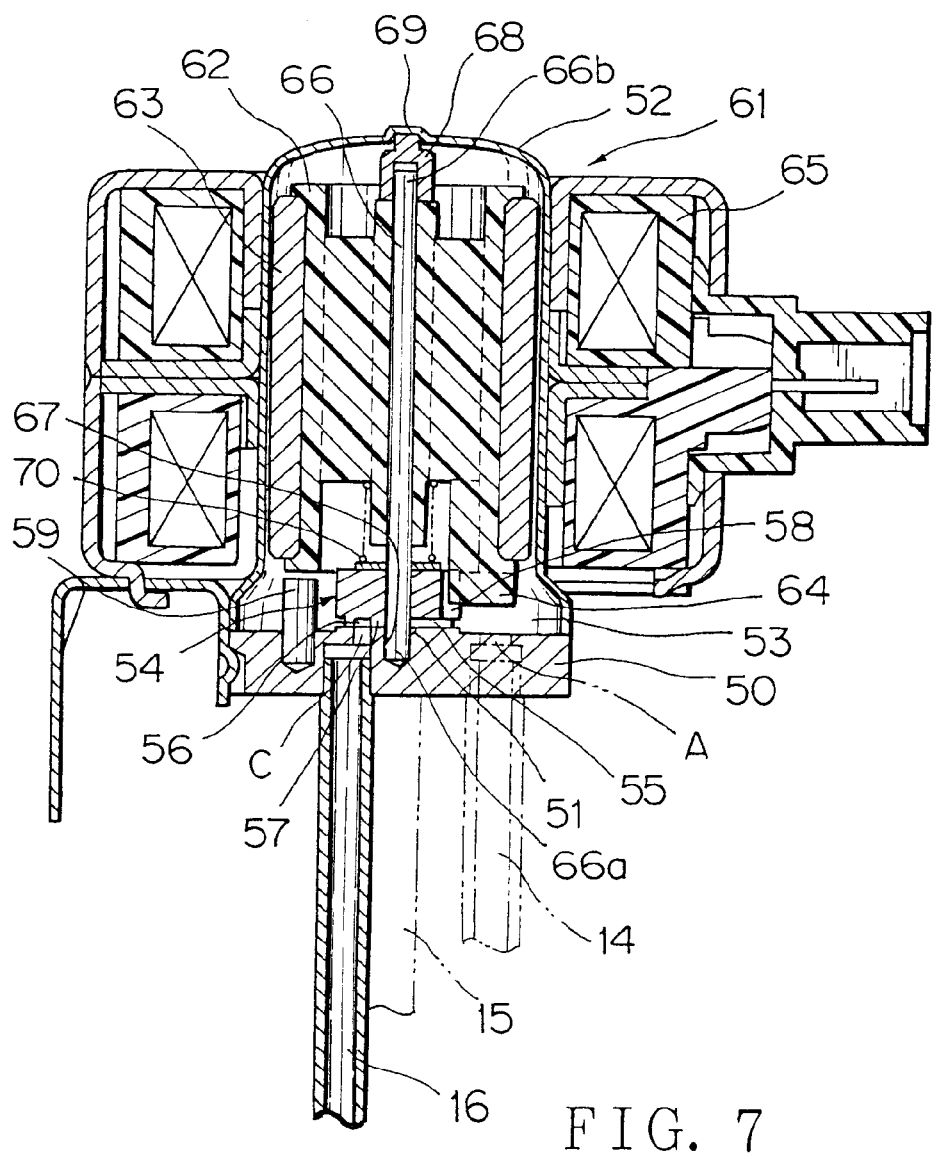
FIG. 7 is a sectional view showing a second embodiment of the inventive electrically operated selector valve.
Figure 8:
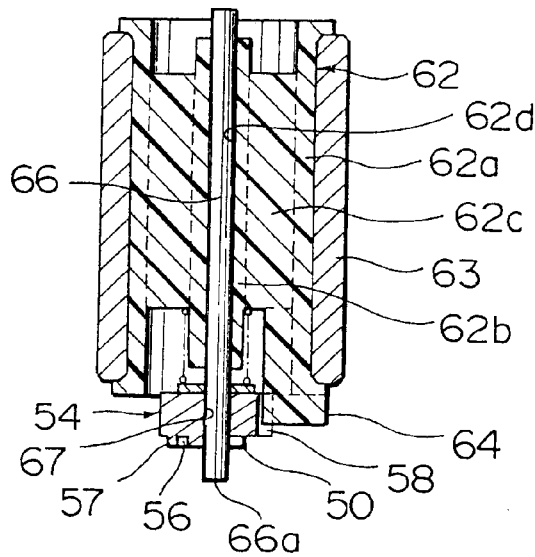
FIG. 8 is a sectional view of a rotor of the electrically operated selector valve of FIG. 7.
Figure 10:
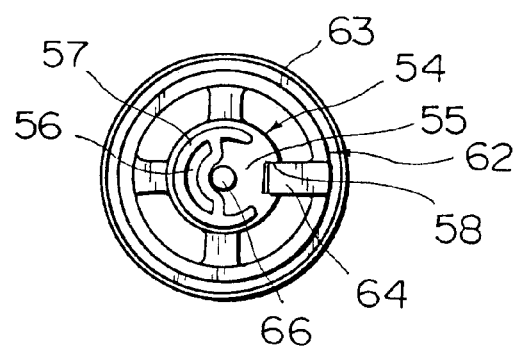
FIG. 10 is a bottom view of the rotor of the electrically operated selector valve of FIG. 7.
Figure 9:
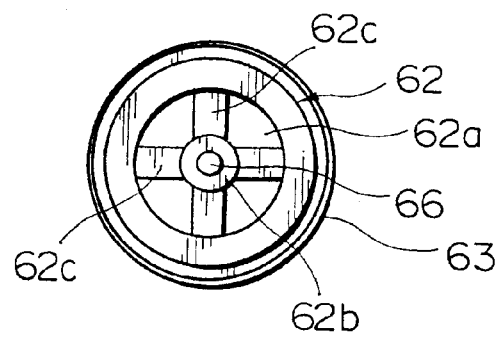
FIG. 9 is a top view of the rotor of the electrically operated selector valve of FIG. 7.

A specific structure of the refrigerating cycle unit for the refrigerator-freezer according to an inventive preferred embodiment First, the structure of the refrigerating cycle unit in accordance with an inventive embodiment is described in reference to FIG. 1.

As shown in FIG. 1, the refrigerating cycle unit for the refrigerator-freezer has a compressor 1, a condenser (radiator) 2, a freezer-applied capillary tube (C.T.F) 3, a refrigerator-applied capillary tube (C.T.R) 4, a freezer-applied evaporator 5, a refrigerator-applied evaporator 6, and an electrically operated selector valve (electric three-way type selector valve) 7.

The condenser 2 is connected to the discharge side of the compressor 1. An inlet port A of the electrically operated selector valve 7 is connected to the down stream of the condenser 2. The freezer-applied capillary tube 3 is connected to a first outlet port B of the electrically operated selector valve 7. The refrigerator-applied capillary tube 4 is connected to a second outlet port C of the electrically operated selector valve 7. The refrigerator-applied evaporator 6, the freezer-applied evaporator 5, and the compressor 1 are successively connected on the downstream of the refrigerator-applied capillary tube 4. And, the downstream of the freezer-applied capillary tube 3 is connected with the downstream of the refrigerator-applied evaporator 6 and to the upstream of the freezer-applied evaporator 5.

A Specific Structure of the Electrically Operated Selector Valve According to an Inventive First Preferred Embodiment Next, the electrically operated selector valve in accordance with the inventive first embodiment is described in reference to FIG. 2–FIG. 6.

The electrically operated selector valve 7 has a cylindrical valve chamber 11 in a valve housing 10. On the valve housing 10, one inlet port A bored through a peripheral wall of the valve chamber 11 and therefore normally communicating with the valve chamber 11 is formed. And on the valve housing 10, a first outlet port B and a second outlet port C both bored through a bottom face (sheet face) 12 of the valve chamber 11 are formed. Here, the first outlet port B and the second outlet port C are arranged equally apart form the center of the bottom face 12 of the valve chamber and are apart from each other in a circumferential direction.

The outlet side of the condenser 2 (the downstream) is connected to the inlet port A by an A-fitting 14. An entrance side of the freezer-applied capillary tube 3 is connected to the first outlet port B by a B-fitting 15. An entrance side of the refrigerator-applied capillary tube 4 is connected to the second outlet port C by a C-fitting 16.

A valve body 17 in a short cylindrical shape is rotatably provided in the valve chamber 11. On an end face, facing the bottom face 12 of the valve chamber 11, of the valve body 17, an opening area 18 open to the valve chamber 11 and a non-opening area 19 not open to the valve chamber 11 are formed as port open-close shaped portions. A rib-shaped partition wall portion 20 dividing the areas 18,19 is projectingly formed. The valve body 17 can slide on the bottom face 12 of the valve chamber 11 with the lower end surface of the partition wall portion 20. The non-opening area 19 is surrounded with the partition wall portion 20 substantially in a D-shape and is a pocket (recess).

A stepping motor 21 is provided on the valve housing 10 as an electric actuator which steppingly turns the valve body 17.

The stepping motor 21 is provided with a lower cover 22 securely attached airtight to the valve housing 10, a cap-like rotor casing 23 adhered airtight to the lower cover 22, a magnet 24 and a rotor 25 both rotatably provided in the rotor casing 23, and a cylindrical stator coil assembly 26 fixed around the rotor casing 23.

The rotor 25 and the magnet 24 are separate parts. A keyway 27 is formed on an outer surface of the rotor 25, and a key projection 28 is formed on an inner surface of the cylindrical magnet 24. The rotor 25 and the magnet 24 are united by inserting the key projection 28 into the keyway 27. A press-fit condition between the keyway 27 and the key projection 28 is due to each width dimensions and can be regulated, for example, by providing a press-fit projection on a side surface of the keyway 27.

With this connection structure, cost reduction of parts is attained, and silentivity without ricketiness between the rotor 25 and the magnet 24 is attained.

The valve body 17 is connected with a valve holder member 29 while restricted in a rotation (or turning) direction. The valve holder member 29 is connected with the rotor 25 while restricted in the rotation direction. The rotation (or turning) of the rotor 25 is transferred to the valve body 17 through valve holder member 29.

The valve body 17 and the valve holder member 29 are aligned by fitting a centering projection 31 formed on the valve holder member 29 in a centering hole 30 formed on the valve body 17. A projection 33 formed on the valve holder member 29 fits in a positioning cutout 32 formed on the valve body 17 for the positioning in the rotation direction.

The rotational positioning of the rotor 25 and the valve holder member 29 is carried out by fitting a positioning flat portion 34 formed on the valve holder member 29 in a positioning engaging portion 35 formed on the rotor 25. That is, though the rotor 25 and the valve holder member 29 do not make relative displacement in the rotation direction by means of the positioning and fitting structure, they make relative displacement in an axial direction. Specifically, the valve holder member 29 can vertically move relative to the rotor 25. A coming-off is prevented by a coming-off prevention portion 36 of the valve holder member 29 fitting in the engaging hole 37 of the rotor 25.

A spring 38 is provided between step portions of the rotor 25 and the valve holder member 29. The spring 38 is preloaded, and therefore the valve body 17 is energized toward a valve chamber bottom face 12 through the valve holder member 29.

With this spring energizing structure, the valve body 17 is put into parallel contact with the valve chamber bottom face 12. Here, the valve body 17 can swing, against the valve holder member 29. And, the spring, 38 functions as a vibration isolating member, so that the vibration of the motor is not transferred to the valve body 17.

An end side of the rotor 25 (a bottom end portion 25A shown in FIG. 2) fits in, and is rotatably supported by, a rotor supporting portion 39 of the valve housing 10. A central shaft body 40 is provided on the top side of the rotor 25. The end of the central shaft body 40 fits in, and is rotatably supported by, a recess 41 formed on a ceiling face of the rotor casing 23.

The rotor 25 is concentrically supported by the rotor casing 23 and the valve housing 10 with the upper portion a and the lower portion b respectively, thereby not arising a ricketiness and/or a scratch. Here, the recess 41 of the rotor casing 23 can be formed by the press work so that cost reduction of the rotor bearing portion can be attained.

A stopper tooth portion 42 projects on a top face of a lower cover 22 and is covered by a yielding rubber 43. And, a stopper-bumping projecting portion 44 is formed on a bottom end portion of the magnet 24. The stopper-bumping projecting portion 44 abuts the yielding rubber 43, and the turning movement of a united body of the rotor 25 and the magnet 24 is limited. For setting of a base point (0-point setting) of the stepping motor 21, an initial position of the rotation direction of the united body of the rotor 25 and the magnet 24 is set. This initial position is a later-described first changeover position obtained with a 0 pulse. Because the yielding rubber 43 is provided on the stopper tooth portion 42, a collision noise does not arise, and therefore silentivity is attained.

Because the valve body 17 is steppingly turned by the stepping motor 21, obtained are the following four positions; a first changeover position (FIG. 6A) where a first outlet port B and a second outlet port C are in the opening area 18, a second changeover position (FIG. 6B) where only the first outlet port B is in the opening area 18 and the second outlet port C is in the non-opening area 19, a third changeover position (FIG. 6C) where the first outlet port B and the second outlet port C are in the non-opening area 19, and a fourth changeover position (FIG. 6D) where only the second outlet port C is in the opening area 18 and the first outlet port B is in the non-opening area 19.

In the changeover operations stated above, because the non-opening area 19 has a pocket-like shape surrounded by the rib-shaped partition wall portion 20, the pocket-like portion acts as a pressure receiving surface of a differential pressure, the valve body 17 is pushed toward the valve chamber bottom face 12 and the rib-shaped partition wall portion 20 is pushed toward the valve chamber bottom face 12 with a suitable pressure, whereby a suitable valve cutoff property is obtained and a valve leak does not arise.

Next, the operation of the refrigerating cycle unit, shown in FIG. 1 and including the electrically operated selector valve 7 of the above first embodiment, for the refrigerator-freezer is described. The valve body 17 of the electrically operated selector valve 7 is steppingly turned by the stepping motor 21 being an electric actuator, and the above four positions are obtained. At the first changeover position shown in FIG. 6A the inlet port A communicates with both of the first outlet port B and the second outlet port C through the valve chamber 11, and at the second changeover position shown in FIG. 6B the inlet port A communicates with only the first outlet port B through the valve chamber 11. At the third changeover position shown in FIG. 6C the inlet port A does not communicate with both of the first outlet port B and the second outlet port C, and at the fourth changeover position shown in FIG. 6D the inlet port A communicates with only the second outlet port C through the valve chamber 11.

Accordingly, a first operating mode wherein both of the freezer-applied capillary tube 3 and the refrigerator-applied capillary tube 4 are connected to the down stream of the condenser 2 is obtained at the first changeover position. A second operating mode wherein only the freezer-applied capillary tube 3 is connected to the down stream of the condenser 2 is obtained at the second changeover position. A third operating mode, being a entirely closed state, wherein both of the freezer-applied capillary tube 3 and the refrigerator-applied capillary tube 4 are not connected to the down stream of the condenser 2 is obtained at the third changeover position. And, a fourth operating mode wherein only the refrigerator-applied capillary tube 4 is connected to the down stream of the condenser 2 is obtained at the fourth changeover position.

The first operating mode is a whole freezer/refrigerator cooling operation, wherein a cooling effect with the full operation relative to the evaporation load of the freezer-applied evaporator 5 and the refrigerator-applied evaporator 6 is secured at the starting.

The second operating mode executes a freezer preferential cooling operation, wherein the freezer is in operation and the refrigerator is not in operation.

The third operating mode is an entirely closed state, wherein a refrigerant of high temperature and high pressure is prevented from flowing into the freezer-applied evaporator 5 and the refrigerator-applied evaporator 6 at the operation shutdown state and the operation shutdown can be elongated.

The fourth operating mode executes a refrigerator preferential cooling operation, wherein the refrigerator is in operation and the freezer is not in operation.

With the above diverse and accurate operation/control, high-performability and energy saving of the refrigerator-freezer can be compatible more highly.

A specific structure of the electrically operated selector valve according to an inventive second preferred embodiment Next, the electrically operated selector valve in accordance with the inventive second embodiment is described in reference to FIG. 7–FIG. 12. Here, in FIG. 7–FIG. 12, portions corresponding to those of FIG. 2–FIG. 6 are denoted with the same reference characters as those of FIG. 2–FIG. 6, and their descriptions are omitted.

An electrically operated selector valve 7 has a disc-shaped base plate 50. The base plate 50 is made of metal such as stainless steel, and a first outlet port B (FIG. 12) and a second outlet port C are bored through a valve seat bed portion 51 formed at the central portion of the base plate 50. And, an inlet port A is bored therethrough outside the valve seat bed portion 51 on the base plate 50. Here, the first outlet port B and the second outlet port C are arranged equally apart form the center of the valve seat bed portion 51 and are apart from each other in a circumferential direction.

In the second embodiment, the outlet side of the condenser 2 (the downstream) is connected to the inlet port A by an A-fitting 14. The entrance side of the freezer-applied capillary tube 3 is connected to the first outlet port B by a B-fitting 15. The entrance side of the refrigerator-applied capillary tube 4 is connected to the second outlet port C by a C-fitting 16.

A cap-like rotor casing 52 made of metal is, for example, welded to the top face of the base plate 50 circumferentially airtight. A rotor/valve chamber 53 is formed by the rotor casing 52 and the base plate 50 airtight. The inlet port A normally communicates with the rotor/valve chamber 53.

A valve body 54 in a short cylindrical shape is rotatably provided in the rotor/valve chamber 53. The valve body 54 is almost the same as the valve body 17 of the first embodiment. On an end face, facing the valve seat bed portion 51, of the valve body 54, an opening area 55 open to the rotor/valve chamber 53 and a non-opening area 56 not open to the rotor/valve chamber 53 are formed as port open-close shaped portions. A rib-shaped partition wall portion 87 dividing the areas 55,56 is projectingly formed. The valve body 54 can slide on the valve seat bed portion 51 with the lower end surface of the partition wall portion 57. The non-opening area 56 is surrounded with the partition wall portion 57 substantially in a D-shape and is a pocket (recess).

A rotor 62 of a stepping motor 61 which steppingly turns the valve body 54 is provided in the rotor casing 52. A stator coil assembly member 65, being cylindrical, of the stepping motor 61 is fixed to the outside of the rotor casing 52. A multipolar magnet 63 is fixed to the outside of the rotor 62. The rotor 62 is formed of molded resin, and the magnet 63 is insert-molded therein. Here, the magnet 63 may be of a plastic magnet and can be integrally molded with the rotor 62. And, the rotor 62 has a hollow in the center and has an outer cylinder portion 62a, a center hub portion 62b, and a spoke portion 62c connecting the cylinder portion 62a and the center hub portion 62b.

A projecting portion 64 is formed at the end portion of the rotor 62, a groove portion 58 is formed at the valve body 54, and the projecting portion 64 and the groove portion 58 engage each other. The valve body 54 is directly connected with the rotor 62 mutually rigidly in the rotation (or turning) direction by this engagement. The rotation angle of the valve body 54 with respect to the magnetic pole of the magnet 63 of the rotor 62 is set.

A stopper pin 59 is fixed to the base plate 50. The projecting portion 64 of the rotor abuts the stopper pin 59 when turns. With this abutment, the turning movement of the rotor 63 is limited. With this, an initial position of the rotation direction of the rotor 63 is set, and setting of a base point (0-point setting) of the stepping motor 61 is carried out.

Figure 11A:
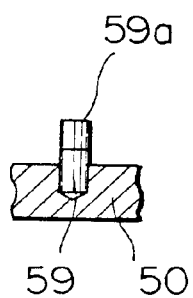
FIGS. 11A, 11B are sectional views of a stopper pin portion of the electrically operated selector valve of FIG. 7.
Figure 11B:
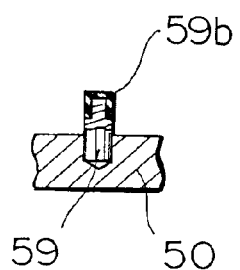
Figure 12A:
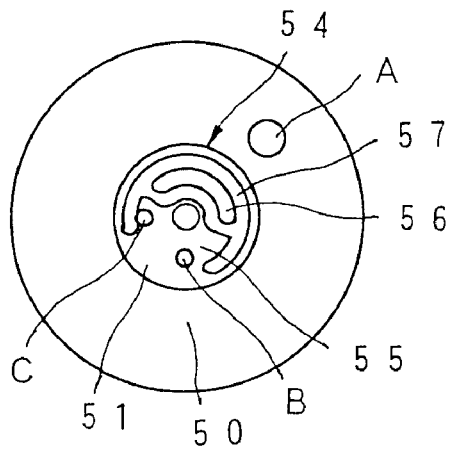
FIGS. 12A–12D are schematic illustrations showing changeover positions of the electrically operated selector valve of FIG. 7.
Figure 12B:
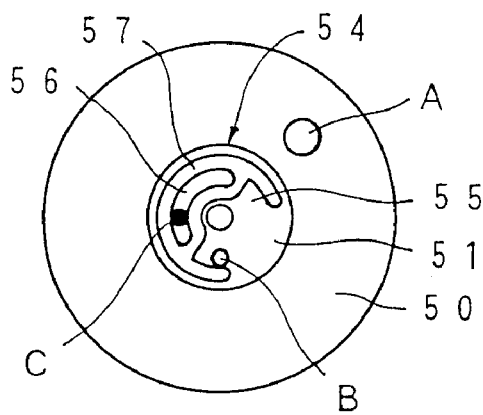
Figure 12C:
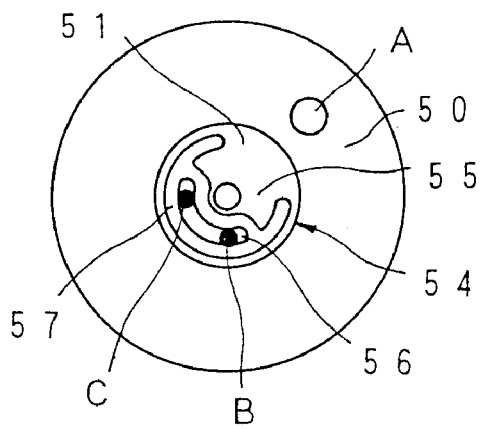
Figure 12D:
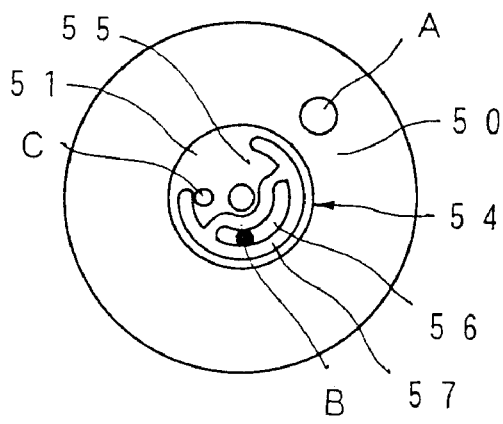

As shown in FIG. 11A, a shock absorbing resin 59a or a shock absorbing rubber 59b is provided around the stopper pin 59. With this, a collision noise does not arise, and therefore silentivity is attained.

A center hole 62d is bored through the hub portion 62b being a core of the rotor 62, and a supporting shaft 66 fits in the center hole 62d. The supporting shaft 66 is put through the valve body 54 with a suitable clearance 67. An end portion (bottom end) 66a of the supporting shaft 66 rotatably engages a bearing hole 67 formed on the base plate 50, thereby being supported by the base plate 50. A bearing member 68 made of slidable material fits on the other end (top end) 66b of the supporting shaft 66. The bearing member 68 rotatably engages the bearing recess 69 formed on the top of the rotor casing 52. By this, the other end 66b of the supporting shaft 66 is supported by the rotor casing 52.

A compression coiled spring 70 is provided between the rotor 62 and the valve body 54. The compression coiled spring 70 pushes the valve body 54 toward the valve seat bed portion 51 of the base plate 50. Because the supporting shaft 66 is put through the valve body 54 with a suitable clearance and the compression coiled spring 70 pushes the valve body 54 toward the valve seat bed portion 51 of the base plate 50, even if a vertical accuracy of the supporting shaft 66 against the valve body 54 is not sufficient, cohesivity of the valve body 54 against the valve seat bed portion 51 is secured and a suitable valve cutoff property is obtained.

Because the valve body 54 is steppingly turned by the stepping motor 61, obtained are the following four positions; a first changeover position (FIG. 12A) where a first outlet port B and a second outlet port C are in the opening area 55, a second changeover position (FIG. 12B) where only the first outlet port B is in the opening area 55 and the second outlet port C is in the non-opening area 56, a third changeover position (FIG. 12C) where the first outlet port B and the second outlet port C are in the non-opening area 56, and a fourth changeover position (FIG. 12D) where only the second outlet port C is in the opening area 55 and the first outlet port B is in the non-opening area 56. The above changeover operation is the same as that of the first embodiment.

In the changeover operations stated above, because the non-opening area has a pocket-like shape surrounded by the rib-shaped partition wall portion 57, the pocket-like portion acts as a pressure receiving surface of a differential pressure, the valve body 54 is pushed toward the valve seat bed portion 51 of the base plate 50 and the rib-shaped partition wall portion 57 is pushed toward the valve seat bed portion 51 of the base plate 50 with a suitable pressure, whereby a suitable valve cutoff property is obtained and a valve leak does not arise.

Next, the operation of the refrigerating cycle unit, including the electrically operated selector valve 7 of the above second embodiment, for the refrigerator-freezer is described. The valve body 54 of the electrically operated selector valve 7 is steppingly turned by the stepping motor 61 being an electric actuator, and the above four positions are obtained. At the first changeover position shown in FIG. 12A the inlet port A communicates with both of the first outlet port B and the second outlet port C through the rotor/valve chamber 53, and at the second changeover position shown in FIG. 12B the inlet port A communicates with only the first outlet port B through the rotor/valve chamber 53. At the third changeover position shown in FIG. 12C the inlet port A does not communicate with both of the first outlet port B and the second outlet port C, and at the fourth changeover position shown in FIG. 12D the inlet port A communicates with only the second outlet port C through the rotor/valve chamber 53.

Accordingly, a first operating mode wherein both of the freezer-applied capillary tube 3 and the refrigerator-applied capillary tube 4 are connected to the down stream of the condenser 2 is obtained at the first changeover position. A second operating mode wherein only the freezer-applied capillary tube 3 is connected to the down stream of the condenser 2 is obtained at the second changeover position. A third operating mode, being a entirely closed state, wherein both of the freezer-applied capillary tube 3 and the refrigerator-applied capillary tube 4 are not connected to the down stream of the condenser 2 is obtained at the third changeover position. And, a fourth operating mode wherein only the refrigerator-applied capillary tube 4 is connected to the down stream of the condenser 2 is obtained at the fourth changeover position.

The refrigerant circuit structure of the inventive refrigerating cycle unit for the refrigerator-freezer is not limited to the one shown in FIG. 1. A serial arrangement of the freezer-applied capillary tube 3 and the freezer-applied evaporator 5 a serial arrangement of the refrigerator-applied capillary tube 4 and the refrigerator-applied evaporator 6 may be arranged in parallel, and a connection between the condenser 2 and these two serial arrangements may be changed by the electrically operated selector valve 7.

Susceptibility in Industrial Application

As is clear from the above embodiments, according to the inventive electrically operated selector valve, the valve body is steppingly turned by the electric actuator. The port open-close shaped portion formed at the end face of the valve body moves relative to the outlet ports opening on the flat bottom face of the valve chamber. Because the inlet port normally communicating with the valve chamber is connected with, or is cut off from, the outlet ports, a lot of changeover positions can be obtained with a simple structure.

And, the port open-close shaped portion of the valve body has the rib-shaped partition wall portion by which the opening area communicating with the valve chamber and the non-opening area communicating with the valve chamber are partitioned. Because the non-opening area has a pocket-like shape surrounded by the rib-shaped partition wall portion, the pocket-like portion acts as a pressure receiving surface of a differential pressure, the valve body is pushed toward the valve chamber bottom face (seat face) and the rib-shaped partition wall portion is pushed toward the valve chamber bottom face (seat face) with a suitable pressure, whereby a suitable valve cutoff property is obtained and a valve leak does not arise.

And, because the valve body is pushed toward the valve chamber bottom face (sheet face) by the spring, a suitable valve cutoff property is obtained and a valve leak does not arise.

And, because the electric actuator is the stepping motor and the rotor of the stepping motor is concentrically supported by the rotor casing and the valve housing, the ricketiness and/or a scratch does not arise and silentivity is improved.

And, because the rotor and the magnet are separate parts and integrally joined without ricketiness by means of the key engagement with a press-fit state, cost reduction of parts is attained and silentivity is improved.

And, an initial position of the rotation direction of the united body of the rotor and the magnet is set by the abutting stopper, and the setting of a base point (0-point setting) of the stepping motor is securely carried out.

And, the valve body is steppingly turned by the electric actuator, the port open-close shaped portion formed at the end face of the valve body moves relative to the first outlet port and the second outlet port both opening on the flat bottom face of the valve chamber, and the four positions are obtained. At the first changeover position the inlet port communicates with both of the first outlet port and the second outlet port, and at the second changeover position the inlet port communicates with only the first outlet port. At the third changeover position the inlet port does not communicate with both of the first outlet port and the second outlet port, and at the fourth changeover position the inlet port communicates with only the second outlet port. With the above diverse and accurate operation/control, high-performability and energy saving of the refrigerator-freezer can be compatible more highly.

And, the valve body is steppingly turned by the electric actuator. The port open-close shaped portion formed at the end face of the valve body moves relative to the outlet ports opening on the base plate. Because the inlet port is connected with, or is cut off from, the outlet ports, a lot of changeover positions can be obtained with a simple structure. And, the base plate can be formed with a metal sheet, and the valve housing can be easily formed without complicated machining, whereby the electrically operated selector valve can be downsized, weight-saved, and cost-reduced.

And, the projecting portion is formed at the end portion of the rotor, the groove portion is formed at the valve body, and the projecting portion and the groove portion engage each other. The valve body is directly connected with the rotor mutually rigidly in the rotation direction by this engagement. The rotation angle of the valve body with respect to the magnetic pole of the magnet of the rotor is accurately set.

With the abutment of the projecting portion of the rotor and the stopper of the base plate, the turning movement of the rotor is limited. With this, an initial position of the rotation direction of the rotor is set, and setting of a base point (0-point setting) of the stepping motor is securely carried out.

And, the port open-close shaped portion of the valve body has the rib-shaped partition wall portion by which the opening area communicating with the rotor/valve chamber and the non-opening area communicating with the rotor/valve chamber are partitioned. Because the non-opening area has a pocket-like shape surrounded by the rib-shaped partition wall portion, the pocket-like portion acts as a pressure receiving surface of a differential pressure, the valve body is pushed toward the base plate and the rib-shaped partition wall portion is pushed toward the base plate with a suitable pressure, whereby a suitable valve cutoff property is obtained.

And, both the ends of the supporting shaft of the rotor are rotatably supported. Because the supporting shaft is put through the valve body with a suitable clearance and the spring pushes the valve body toward the base plate, even if a vertical accuracy of the supporting shaft against the valve body is not sufficient, cohesivity of the valve body against the base plate is secured and a suitable valve cutoff property is obtained.

And, a shock absorbing resin or a shock absorbing member is provided around the stopper. With this, a collision noise does not arise, and therefore silentivity is attained.

And, the valve body is steppingly turned by the stepping motor, the port open-close shaped portion formed at the end face of the valve body moves relative to the first outlet port and the second outlet port both opening on the base plate, and the four positions are obtained. At the first changeover position the inlet port communicates with both of the first outlet port and the second outlet port, and at the second changeover position the inlet port communicates with only the first outlet port. At the third changeover position the inlet port does not communicate with both of the first outlet port and the second outlet port, and at the fourth changeover position the inlet port communicates with only the second outlet port. With the above diverse and accurate operation/control, high-performability and energy saving of the refrigerator-freezer can be compatible more highly.

And, according to the inventive refrigerating cycle unit for the refrigerator-freezer, the valve body of the electrically operated selector valve is steppingly turned by the electric actuator, and four operating modes corresponding to the four changeover positions are obtained as follows. A first operating mode wherein both of the freezer-applied capillary tube and the refrigerator-applied capillary tube are connected to the down stream of the condenser is obtained at the first changeover position. A second operating mode wherein only the freezer-applied capillary tube is connected to the down stream of the condenser is obtained at the second changeover position. A third operating mode, being an entirely closed state, wherein both of the freezer-applied capillary tube and the refrigerator-applied capillary tube are not connected to the down stream of the condenser is obtained at the third changeover position. And, a fourth operating mode wherein only the refrigerator-applied capillary tube is connected to the down stream of the condenser is obtained at the fourth changeover position. As above, a diverse and accurate operation/control is carried out, and high-performability and energy saving of the refrigerator-freezer can be compatible more highly.

What is claimed is:

1. An electrically operated selector valve, characterized in that the electrically operated selector valve comprises:

a valve housing having a valve chamber, a single inlet port normally communicating with the valve chamber, and outlet ports opening on a flat bottom face of the valve chamber while being apart from each other, a valve body rotatably provided in the valve chamber, having a port open-close shaped portion, on an end face facing the bottom face of the valve chamber, to connect, or cut off, the valve chamber from the outlet port, and changing the connection, or the cutoff, between the valve chamber and the outlet port by a turning movement of the port open-close shaped portion with respect to the outlet port, and an electric actuator to steppingly turn the valve body.

2. The electrically operated selector valve as set forth in claim 1, characterized in that the port open-close shaped portion of the valve body has a rib-shaped partition wall portion by which an opening area open to the valve chamber and a non-opening area not open to the valve chamber are partitioned, and the non-opening area has a pocket-like shape surrounded by the rib-shaped partition wall portion.

3. The electrically operated selector valve as set forth in claim 2, characterized in that a spring to push the valve body toward the bottom face of the valve chamber is provided.

4. The electrically operated selector valve as set forth in claim 2, characterized in that the outlet ports consists of two ports of a first outlet port and a second outlet port opening apart from each other, and the valve body is steppingly turned by the electric actuator, so that the port open-close shaped portion moves with respect to the first outlet port and the second outlet port, and makes a first changeover position where a first outlet port and a second outlet port communicate with the valve chamber, a second changeover position where only the first outlet port communicates with the valve chamber and the second outlet port is cut off form the valve chamber, a third changeover position where the first outlet port and the second outlet port are cut off from the valve chamber, and a fourth changeover position where only the second outlet port communicates with the valve chamber and the first outlet port is cut off from the valve chamber.

5. The electrically operated selector valve as set forth in claim 1, characterized in that a spring to push the valve body toward the bottom face of the valve chamber is provided.

6. The electrically operated selector valve as set forth in any one of claims 1, 5 and 3, characterized in that the electric actuator is a stepping motor, a cap-like rotor casing is fixed to the valve housing, a stator coil assembly of the stepping motor is fixed to an outside of the rotor casing, a rotor of the stepping motor and a magnet united with the rotor are rotatably provided inside the rotor casing, the valve body is connected to the rotor by a valve holder member, and one end, on a side of the valve holder member, of the rotor engages a rotor supporting portion of the valve housing while being rotatably supported by the valve housing and another end thereof engages a recess formed on the rotor casing while being rotatably supported by the rotor casing.

7. The electrically operated selector valve as set forth in claim 6, characterized in that the rotor and the magnet are separate parts and integrally joined by a key engagement being in a press-fit state.

8. The electrically operated selector valve as set forth in claim 7, characterized in that communicates with the valve chamber and the second outlet port is cut off from the valve chamber, a third changeover position where the first outlet port and the second outlet port are cut off from the valve chamber, and a fourth changeover position where only the second outlet port communicates with the valve chamber and the first outlet port is cut off from the valve chamber.

9. The electrically operated selector valve as set forth in claim 6, characterized in that an abutting stopper to limit a turning movement of a united body of the rotor and the magnet and to set an initial position of a turning direction of the united body of the rotor and the magnet is provided.

10. The electrically operated selector valve as set forth in claim 1, characterized in that the outlet ports consists of two ports of a first outlet port and a second outlet port opening apart from each other, and the valve body is steppingly turned by the electric actuator, so that the port open-close shaped portion moves with respect to the first outlet port and the second outlet port, and makes a first changeover position where a first outlet port and a second outlet port communicate with the valve chamber, a second changeover position where only the first outlet port communicates with the valve chamber and the second outlet port is cut off from the valve chamber, a third changeover position where the first outlet port and the second outlet port are cut off from the valve chamber, and a fourth changeover position where only the second outlet port communicates with the valve chamber and the first outlet port is cut off from the valve chamber.

11. A refrigerating cycle unit for a refrigerator-freezer, wherein a refrigerant, through a condenser, from a discharge of a compressor is supplied selectively to a freezer-applied capillary tube and a freezer-applied evaporator or to a refrigerator-applied capillary tube and a refrigerator-applied evaporator and flows to a suction of the compressor, characterized in that the electrically operated selector valve set forth in claim 10 or claim 4 is provided between downstream of the condenser and upstream of either the freezer-applied capillary tube or the refrigerator-applied capillary tube, the inlet port is connected with the downstream of the condenser, the first outlet port is connected with the upstream of the freezer-applied capillary tube, and the second outlet port is connected with the upstream of the refrigerator-applied capillary tube.

12. An electrically operated selector valve, characterized in that the electrically operated selector valve comprises a base plate having an inlet port and outlet ports bored therethrough and acting as a valve seat plate, a cap-like rotor casing connected airtight to one side of the base plate and making an airtight rotor/valve chamber along with the base plate, a valve body rotatably provided in the rotor/valve chamber, having a port open-close shaped portion, on an end face facing the base plate, to connect, or cut off, the inlet port from the outlet port, and changing the connection, or the cutoff, between the inlet port and the outlet port by a turning movement of the port open-close shaped portion with respect to the outlet port, a rotor rotatably provided in the rotor/valve chamber and having a multipole magnet of a stepping motor attached to the valve body, and a cylindrical stator coil assembly member, of the stepping motor, fixed to an outside of the rotor casing.

13. The electrically operated selector valve as set forth in claim 12, characterized in that the rotor and the valve body are connected by engaging a projecting portion formed on the rotor and a groove portion formed on the valve body and are mutually positioned in a rotation direction.

14. The electrically operated selector valve as set forth in claim 13, characterized in that an abutting stopper is provided on the base plate, and a turning movement of the rotor is limited by an abutment of the projecting portion of the rotor and the stopper, and an initial position of a rotation direction of the rotor is set.

15. The electrically operated selector valve as set forth in any one of claims 10, 4 and 14, characterized in that a resin or another material to absorb a shock is provided around the stopper.

16. The electrically operated selector valve as set forth in any one of claims 12–14 characterized in that the port open-close shaped portion of the valve body has a rib-shaped partition wall portion to partition an opening area open to the rotor/valve chamber and a non-opening area not open to the rotor/valve chamber, and the non-opening area has a pocket-like shape surrounded by the rib-shaped partition wall portion.

17. The electrically operated selector valve as set forth in any one of claims 12 to 14, characterized in that a supporting shaft putting through a center portion of the rotor is provided, the supporting shaft is put through the valve body with a suitable clearance, an end portion of the supporting shaft is rotatably supported by the base plate and another end portion of the supporting shaft is rotatably supported by the rotor casing, and a spring to push the valve body toward the base plate is provided between the rotor and the valve body.

18. The electrically operated selector valve as set forth in any one of claims 12 to 14, characterized in that the outlet ports consists of two ports of a first outlet port and a second outlet port opening apart from each other, and the valve body is steppingly turned by the stepping motor, so that the port open-close shaped portion moves with respect to the first outlet port and the second outlet port, and makes a first changeover position where a first outlet port and a second outlet port communicate with the rotor/valve chamber, a second changeover position where only the first outlet port communicates with the rotor/valve chamber and the second outlet port is cut off from the rotor/valve chamber, a third changeover position where the first outlet port and the second outlet port are cut off from the rotor/valve chamber, and a fourth changeover position where only the second outlet port communicates with the rotor/valve chamber and the first outlet port is cut off from the rotor/valve chamber.

19. A refrigerating cycle unit for a refrigerator-freezer, wherein a refrigerant, through a condenser, from a discharge of a compressor is supplied selectively to a freezer-applied capillary tube and a freezer-applied evaporator or to a refrigerator-applied capillary tube and a refrigerator-applied evaporator and flows to a suction of the compressor, characterized in that the electrically operated selector valve set forth in claim 18 is provided between downstream of the condenser and upstream of either the freezer-applied capillary tube or the refrigerator-applied capillary tube, the inlet port is connected with the downstream of the condenser, the first outlet port is connected with the upstream of the freezer-applied capillary tube, and the second outlet port is connected with the upstream of the refrigerator-applied capillary tube.

* * * * *

UNITED STATES PATENT AND TRADEMARK OFFICE
CERTIFICATE OF CORRECTION

PATENT NO. : 6,591,619 B2
DATED : July 15, 2003
INVENTOR(S) : Morio Kaneko and Akira Kasai It is certified that error appears in the above-identified patent and that said Letters Patent is hereby corrected as shown below:

<u>Column 12,</u>
Line 1, delete claim 8 and substitute with:
8.  The electrically operated selector valve as set forth in claim 7, characterized in that an abutting stopper to limit a turning movement of a united body of the rotor and the magnet and to set an initial position of a turning direction of the united body of the motor and the magnet is provided.

Signed and Sealed this

Twentieth Day of September, 2005

JON W. DUDAS
*Director of the United States Patent and Trademark Office*